United States Patent [19]

Tomiyori

[11] Patent Number: 4,974,250
[45] Date of Patent: Nov. 27, 1990

[54] ADAPTER FOR MOUNTING A PORTABLE TELEPHONE ON A VEHICLE

[75] Inventor: Yutaka Tomiyori, Tokyo, Japan

[73] Assignee: NEC Corporation, Japan

[21] Appl. No.: 438,620

[22] Filed: Nov. 17, 1989

[30] Foreign Application Priority Data

Nov. 22, 1988 [JP] Japan .................................. 63-295113

[51] Int. Cl.⁵ .......................................... H04M 11/00
[52] U.S. Cl. ...................................... 379/58; 379/441; 379/446; 379/454; 379/455
[58] Field of Search ................. 379/58, 441, 446, 454, 379/455; 381/86

[56] References Cited

U.S. PATENT DOCUMENTS 4,196,319  4/1980  Gates .................................... 379/445

FOREIGN PATENT DOCUMENTS 0332904  9/1989  European Pat. Off. .............. 379/58
0035546  4/1981  Japan .................................... 379/58

Primary Examiner—Jin F. Ng
Assistant Examiner—Dwayne Bost
Attorney, Agent, or Firm—Laff, Whitesel, Conte & Saret

[57] ABSTRACT

An adapter for mounting a portable telephone on a vehicle allows either one of a simple handset and a multi-function handset to be used therewith as desired. The adapter does not need a power switch and associated circuitry and, therefore, reduces the overall weight and size of a portable telephone system. When a multi-function handset is used with the adapter, the adapter is switched on and off by a power switch which is provided on the handset. When a simple handset is used with the adapter, the adapter is switched on and off by an ignition switch which is provided on the vehicle. Further, the adapter promotes easy and convenient use of a handset because it automatically adapts itself to both of a multi-function handset and a simple handset.

4 Claims, 3 Drawing Sheets

4,974,250

ADAPTER FOR MOUNTING A PORTABLE TELEPHONE ON A VEHICLE

BACKGROUND OF THE INVENTION

The present invention relates to an adapter for mounting a portable telephone on a vehicle and, more particularly, to an adapter for such an application which is adaptable to both of a simple handset and a multi-function handset available with a portable telephone.

A portable telephone is mounted on a vehicle with a handset thereof being usually set in a vehicle cabin by using an exclusive adapter. This kind of adapter has customarily been designed for use with a simple handset which does not have a power switch, dialing function, etc. The adapter, therefor, is provided with a power switch for feeding power to the portable telephone system as needed. The power switch of the adapter is accessible for controlling the power supply to the telephone system as well as for dialing purpose. A problem with such an adapter is that the power switch and its associated circuitry increases the overall weight and volume of the adapter while increasing the cost.

In the light of the above, an effort has been made to mount a multi-function handset on a vehicle in place of a simple handset so that the power supply may be controlled by the handset itself. However, when a multi-function handset is used with the prior art adapter which is directed toward a simple handset, it will fail to control the power supply depending on the arrangement of the power switch which is built in the adapter. Although the power switch of the adapter may be omitted, an adapter without a power switch would be unable to control the power supply when used with a simple handset.

SUMMARY OF THE INVENTION

It is therefore an object of the present invention to provide an adaptor capable of automatically switching over a power source in matching relation to the type of a handset of a portable telephone, i.e., a simple handset or a multi-function handset and, yet, having a simple construction.

It is another object of the present invention to provide a generally improved adapter for mounting a portable telephone on a vehicle.

In accordance with the present invention, an adapter for selectively mounting on a vehicle a simple handset having an open handset detecting terminal and a multi-function handset having a handset detecting terminal connecting to ground and a power switch terminal connecting to a power switch, the handset forming a part of a portable telephone system comprises a handset detecting line connected to the handset detecting terminal, a power switch connecting line connected to the power switch terminal, power feeding line for feeding power to the portable telephone system, a switch for switching the supply of power to the power feeding line on and off, a flip-flop being set when the hand-set detecting line is opened and inverted by an input to the power switch connecting line when the handset detecting line is connected to ground, and an AND gate for feeding a control signal to the switch by ANDing an ignition ON state of the vehicle and an output of the flip-flop.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
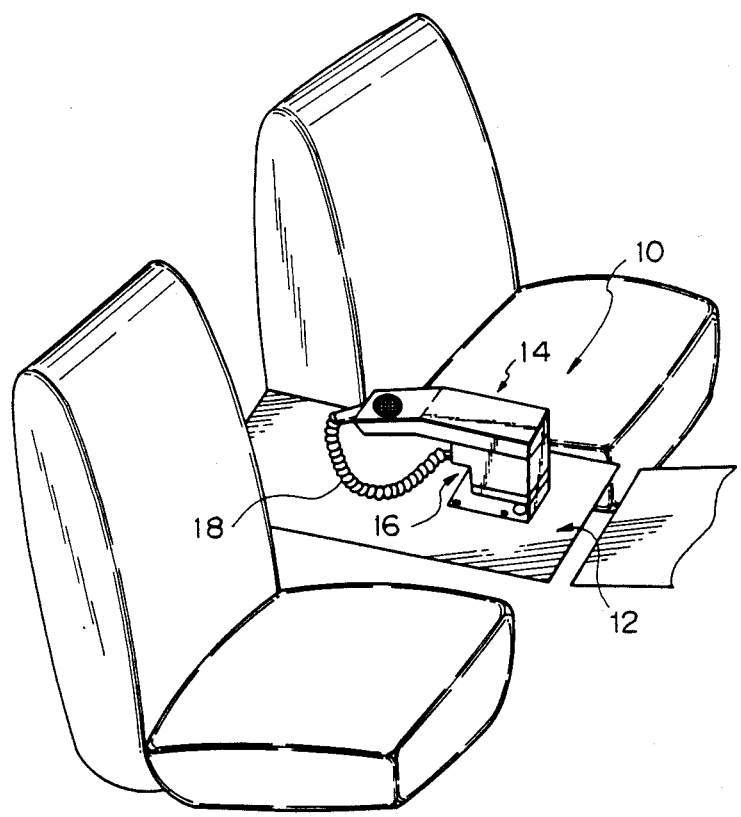
FIG. 1 is a perspective view of a portable telephone system including an adapter embodying the present invention and which is mounted on a console provided in a vehicle cabin.

Referring to FIG. 1 of the drawings, an portable telephone system including an adapter embodying the present invention is shown and generally designed by the reference numeral 10. As shown, the system 10 is mounted on a console 12 which is located in a vehicle cabin. The system 10 has a handset 14 and an adapter 16 on which the handset 14 rests. The handset 14 and adaptor 16 are electrically interconnected by a curl cord 18.

Figure 2:
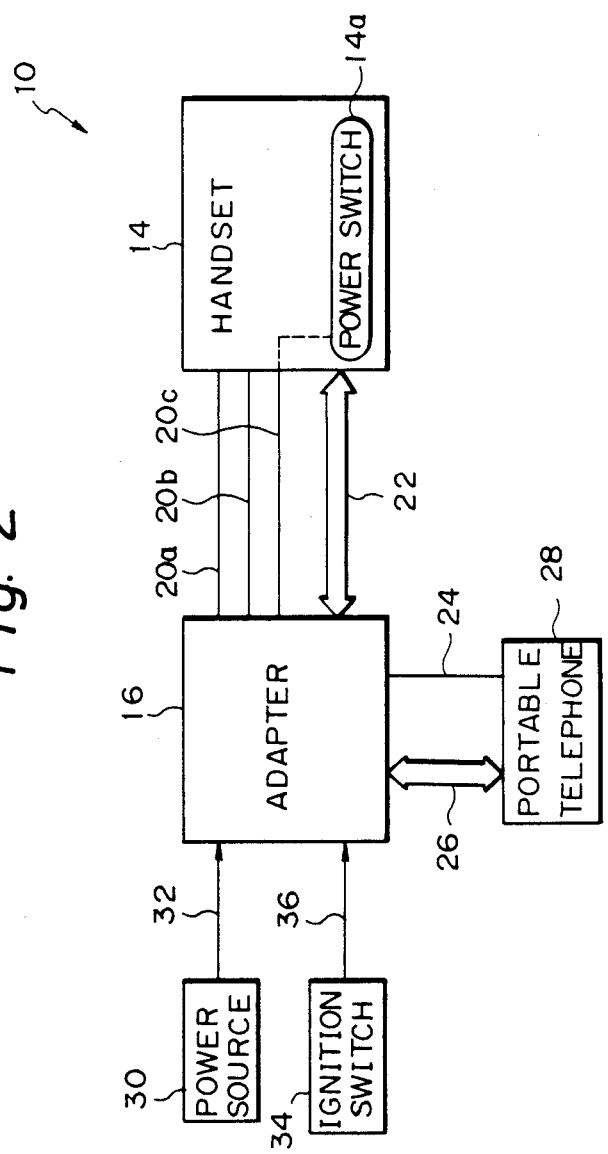
FIG. 2 is a schematic block diagram showing electric circuitry of the system shown in FIG. 1.

FIG. 2 shows the circuit arrangement of the system 10 schematically. The handset 14 is connected to the adapter 16 by a power feeding line 20a, a handset detecting line 20b, a power switch connecting line 20c, and a signal line 22 which the curl cord 18. Likewise, a portable telephone 28 is connected to the adapter 16 by a power feeding line 24 and a signal line 26. Further, a power source 30 and an ignition switch 34 are connected to the adapter 16 by a power source line 32 and an ignition detecting line 36, respectively. The handset 14 has a power switch 14a only when it is of the multi-function type. The power switch connecting line 20c is connected to the power switch 14a only when such a multi-function handset is mounted on the adapter 16, as described in detail later. Power fed from the power source 30 over the power feeding line 32 is applied to the handset 14 via the power feeding line 20a and to the telephone 28 via the power feeding line 24, under the control of the adapter 16. The controlled power is also fed to various circuits which are built in the adapter 16. When the handset 14 is of the multi-function type, the handset detecting line 20b is connected to ground at the handset 14 while the power switch connecting line 20c is connected to the power switch 14a of the handset 14. In this configuration, by turning on the power switch 14a of the handset 14 while the ignition switch 34 is turned on, it is possible to on-off control the power supply to the entire system 10 which includes the adapter 16, telephone 28, and handset 14. When the handset 14 is a simple handset which does not have the power switch 14a, the handset detecting line 20b is left open so that the on-off control of the power supply to the system 10 is interlocked with the on-off of the ignition switch 34.

Figure 3:
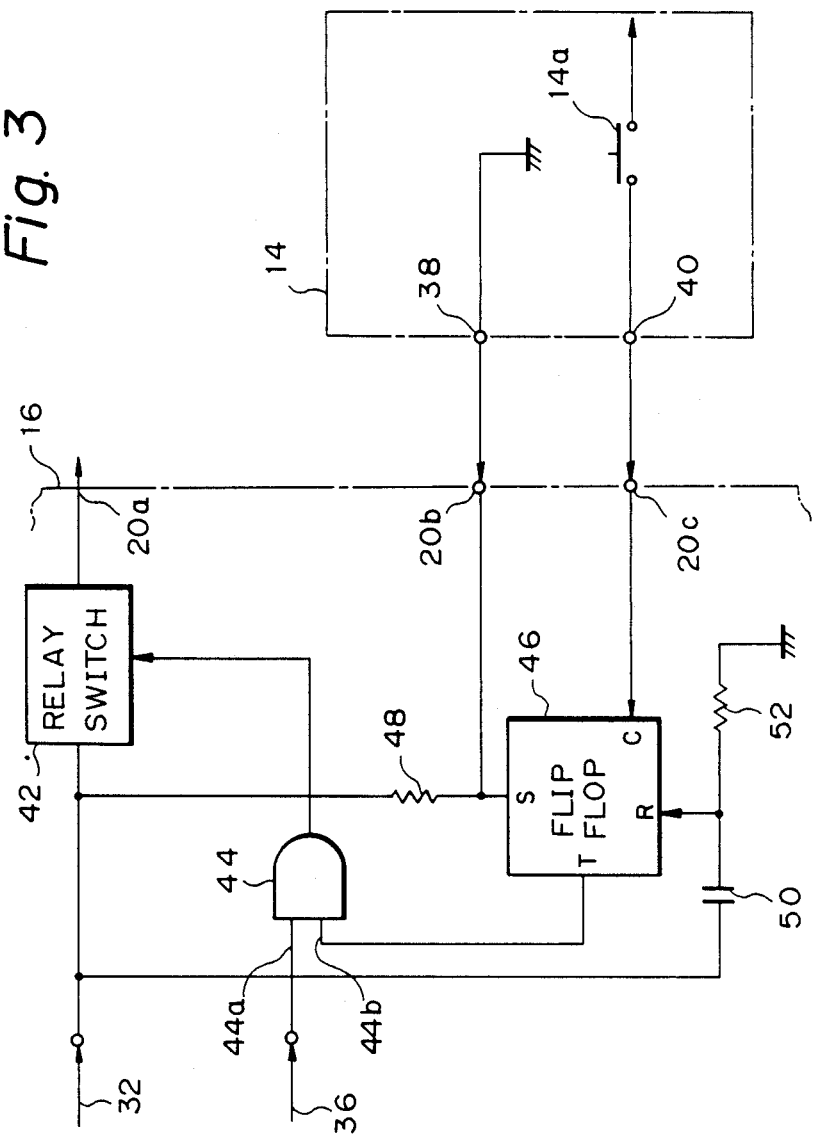
FIG. 3 is a schematic block diagram showing a specific construction of the adapter and a handset which are shown in FIGS. 1 and 2.

Referring to FIG. 3 a specific construction of the handset 14 and adapter 16 is shown. In the figure, the handset 14 is assumed to be a multi-function handset. As shown, the handset 14 has a handset detecting terminal 38 and a power switch terminal 40. The handset detecting terminal 38 is connected to ground, while the power switch terminal 40 is connected to the power switch 14a. As the handset 14 is mounted on the adapter 16, the terminals 38 and 40 are brought into connection with the handset detecting line 20b and power switch connecting line 20c, respectively. In the case that the handset 14 is a simple handset, the handset detecting terminal 38 is in a floating state while no power switch is connected to the power switch terminal 40.

The adapter 16 has a relay switch 42 for controlling the power which is to be fed from the power source 30 to the power feeding line 20a of the system 10 via the power source line 32. The relay switch 42 is on-off controlled in response to an output of a 2-input AND gate 44, i.e., a high level or a lower level. Specifically, the AND gate 44 has a first input 44a connecting to the ignition detecting line 36 and a second input 44b connecting to an output T of a T flip-flop 46. Only when both the inputs 44a and 44b are in a high level, the relay switch 44 produces a high level output. The flip-flop 46 has a set terminal S which is connected to the power source 30 via a resistor 48 and the power source line 32 and directly connected to the handset detecting line 20b. A clock terminal C of the flip-flop 46 is connected to the power switch connecting line 20c. A reset terminal R of the flip-flop 46 is connected serially to the power source 30 via a capacitor 50 and the power source line 32 and to ground via a resistor 52.

In operation, on the turn-on of power supply, an initializing circuit constituted by the power source 30, power feeding line 32, capacitor 50 and resistor 52 feeds a high level signal to the reset terminal R of the T flip-flop 46. As a predetermined period of time expires, the reset condition of the flip-flop 46 is cancelled due to the discharge of the capacitor 50 resulting in the adapter 16 being initialized. When the handset 14 is of the multi-function type, the handset detecting line 20b is caused into connection with the handset detecting terminal 38 of the handset 14 which is connected to ground. Hence, a low level signal is continuously applied to the set terminal S of the flip-flop 46. The clock terminal C of the flip-flop 46 is connected to the power switch 14a of the handset 14 via the power switch connecting line 20c and power switch terminal 40. In this condition, when the power switch 14a is pressed, one clock pulse will be fed to the clock terminal C of the flip-flop 46. Specifically, after the ignition switch 34 has been turned to deliver a high level signal to the first input 44a of the AND gate 44 via the ignition detecting line 36, a clock pulse is applied to the clock terminal C of the flip-flop 46 when the power switch 14a is pressed. Then, a high level signal is fed from the output T of the flip-flop 46 to the second input terminal 44b of the AND gate 44. As a result, the AND gate 44 feeds a high level signal to the relay switch 42 to turn it on. In this manner, the power source 30 feeds power to the system 10 when the power switch 14a of the handset 14 is pressed. When the power switch 14a is pressed again, the output of the flip-flop 46 and, therefore, the output of the AND gate 44 turns from a high level to a low level to turn off the relay switch 42. Thereafter, the power supply to the system 10 is on-off controlled every time the power switch 14a of the handset 14 is pressed, as long as the ignition switch 34 is turned on. As stated above, despite that the adapter 16 lacks a power switch, one can control the power supply to the system 10 by operating the power switch 14a of the handset 14.

When the handset 14 mounted on the adapter 16 is a simple handset, the handset detecting line 20b is left open or floating. In this condition, a setting line constituted by the power source 30, power feed line 32 and resistor 48 feeds a high level signal to the set terminal S of the flip-flop 46. Then, a high level signal is continuously applied from the output terminal T of the flip-flop 46 to the second input 44b and the AND gate 44 with no regard to the level of the clock terminal C of the flip-flop 46. As a result, the relay switch 42 is turned on and off in interlocked relation with the turn-on and turn-off of the ignition switch 34. This is successful in controlling the power supply to the system 10 even when a simple handset is used.

In summary, the present invention provides an adapter which does not need a power switch and associated circuitry and, therefore, reduces the overall weight and size of a portable telephone system for use on a vehicle. When a multi-function handset is used with the adapter, the adapter is switched on and off by a power switch which is provided on the handset. When a simple handset is used with the adapter, the adapter is switched on and off by an ignition switch which is provided on the vehicle. Further, the adapter promotes easy and convenient use of a handset because it automatically adapts itself to both of a multi-function handset and a simple handset.

Various modifications will become possible for those skilled in the art after receiving the teachings of the present disclosure without departing from the scope thereof.

What is claimed is:

1. An adaptor for selectively mounting on a vehicle a simple handset having an open handset detecting terminal and a multi-function handset having a handset detecting terminal connecting to ground and a power switch terminal connecting to a power switch, said handset forming a part of a portable telephone system, said adapter comprising:
   a handset detecting line connected to the handset detecting terminal;
   a power switch connecting line connected to the power switch terminal;
   power feeding line for feeding power to the portable telephone system;
   switching means for switching supply of power to said power feeding line on and off;
   flip-flop means being set when said hand-set detecting line is opened and inverted by an input to said power switch connecting line when said handset detecting line is connected to ground; and
   AND means for feeding a control signal to said switching means by ANDing an ignition ON state of the vehicle and an output of said flip-flop means.

2. An adapter as claimed in claim 1, wherein said switching means comprises a relay switch.

3. An adapter as claimed in claim 1, wherein said flip-flop means comprises a T flip-flop.

4. An adapter as claimed in claim 1, wherein said AND means comprises a 2-input AND gate.

* * * * *